United States Patent [19]

Weihmuller

[11] 4,027,806

[45] June 7, 1977

[54] RECIPROCATING BELT FEEDER FOR ELONGATED BINS

[75] Inventor: Walter N. Weihmuller, Warsaw, Ind.

[73] Assignee: Supreme Farmstead Equipment, Inc., Silver Lake, Ind.

[22] Filed: Aug. 18, 1975

[21] Appl. No.: 605,268

[52] U.S. Cl. .......................... 214/16 R; 119/52 B; 198/362; 198/585

[51] Int. Cl.² .................. A01K 5/02; B65G 21/12; B65G 41/02

[58] Field of Search .................. 214/16 R, 17 C; 198/110, 126, 89, 97, 101, 67, 218, 585, 362, 631; 119/52 B, 56 R, 52 R

[56] References Cited

UNITED STATES PATENTS

| | | | |
|---|---|---|---|
| 1,521,820 | 1/1925 | Lloyd | 198/218 |
| 3,554,355 | 1/1971 | Berg | 119/52 B |
| 3,605,698 | 9/1971 | Thyberg | 119/52 B |
| 3,695,415 | 10/1972 | Bakker et al. | 119/52 B |
| 3,913,528 | 10/1975 | Rutten et al. | 119/52 B |

Primary Examiner—Trygve M. Blix
Assistant Examiner—Charles E. Frankfort

Attorney, Agent, or Firm—Mason, Kolehmainen, Rathburn & Wyss

[57] ABSTRACT

A reciprocating belt feeder for distributing material from a common supply point into a selected one of a plurality of elongated feed bins arranged in parallel rows in end to end relation includes an elongated conveyor frame with a reversible belt supported on the frame. A drive pinion engages the frame for reciprocally moving the conveyor longitudinally between opposite ends of the rows of feed bins. A clamp device is provided for selectively holding and releasing a run of the conveyor belt and a discharge chute is mounted at each end of the conveyor for selectively discharging material from the belt into a selected bin in a selected row. An automatic control is provided for operating the clamping device to clamp and hold the belt when the frame is driven in one direction relative to the bins and to release the belt when the frame is driven in an opposite direction, and a selector is provided for reversing the sequence of holding and releasing the belt in relation to the direction of travel of the frame relative to the supply point.

8 Claims, 13 Drawing Figures

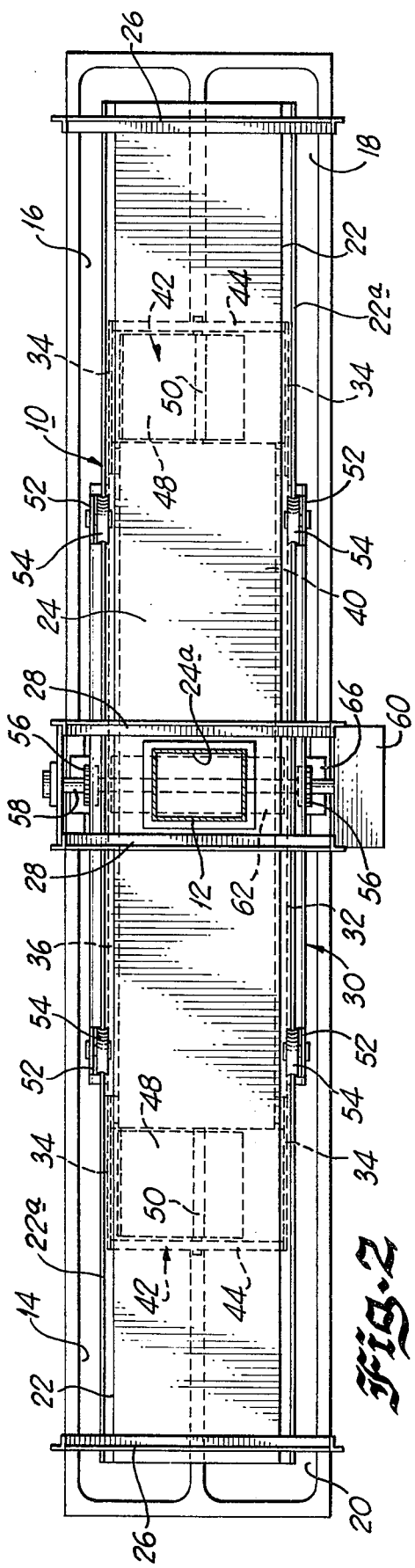
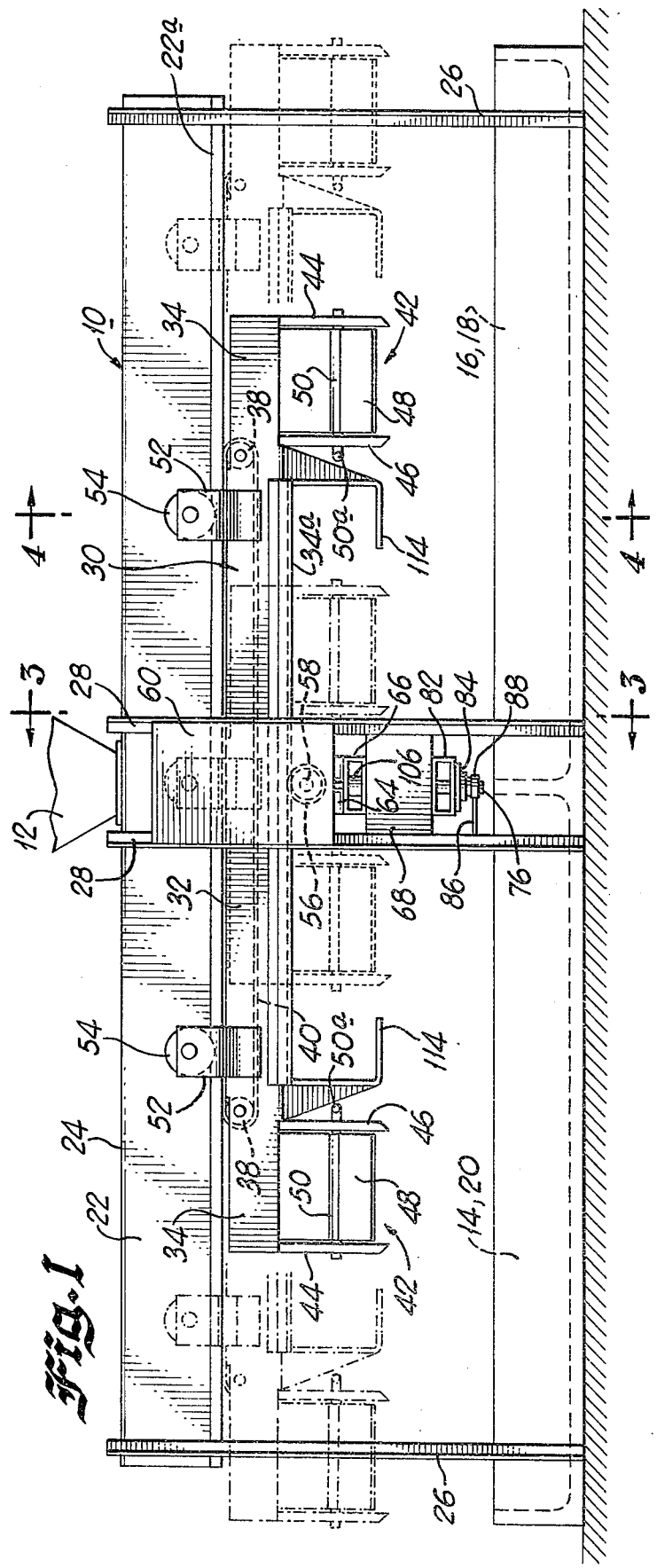

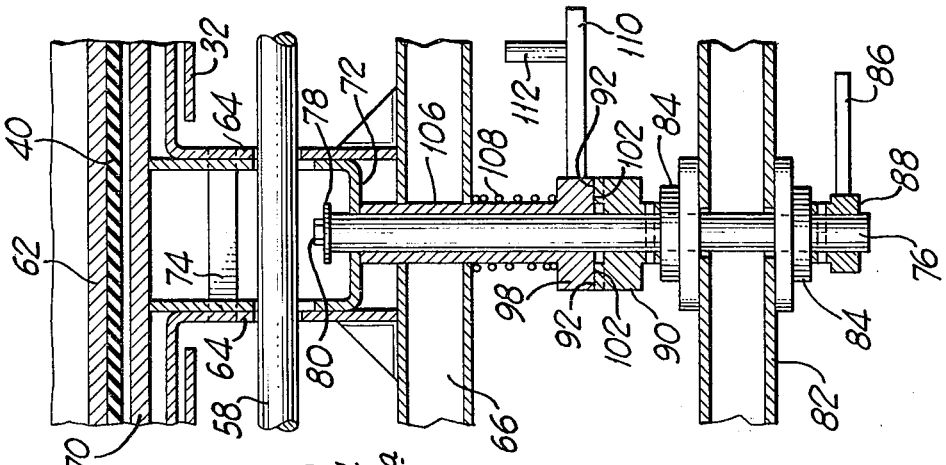
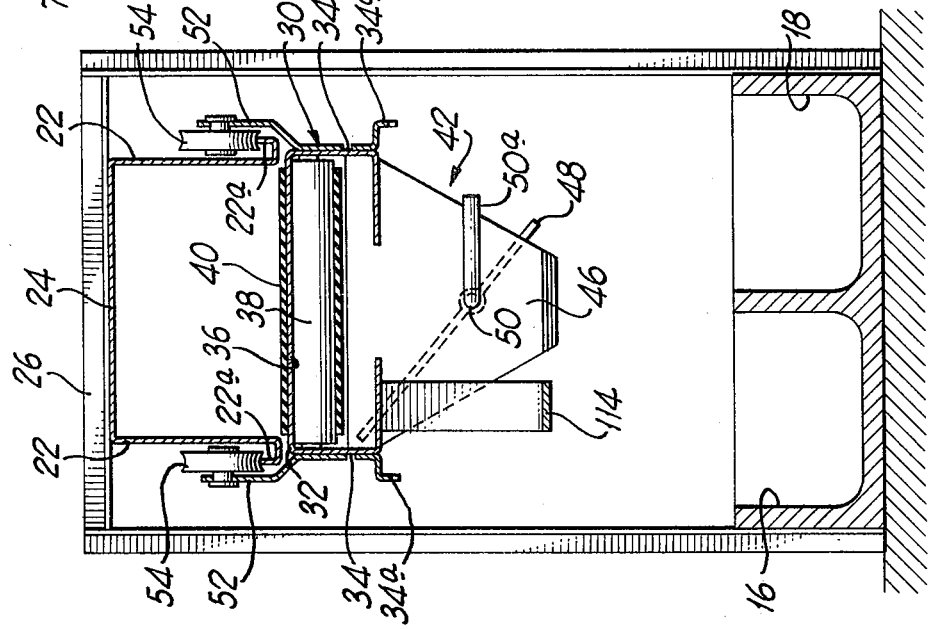
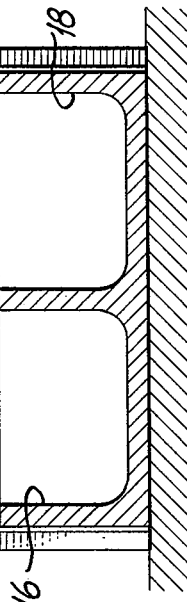
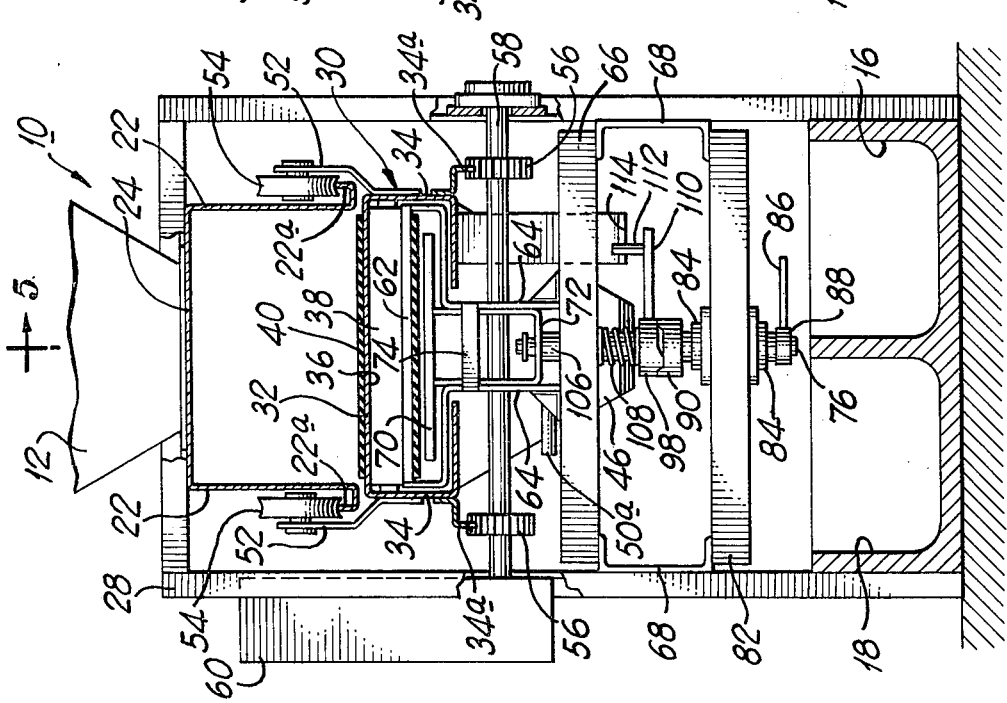

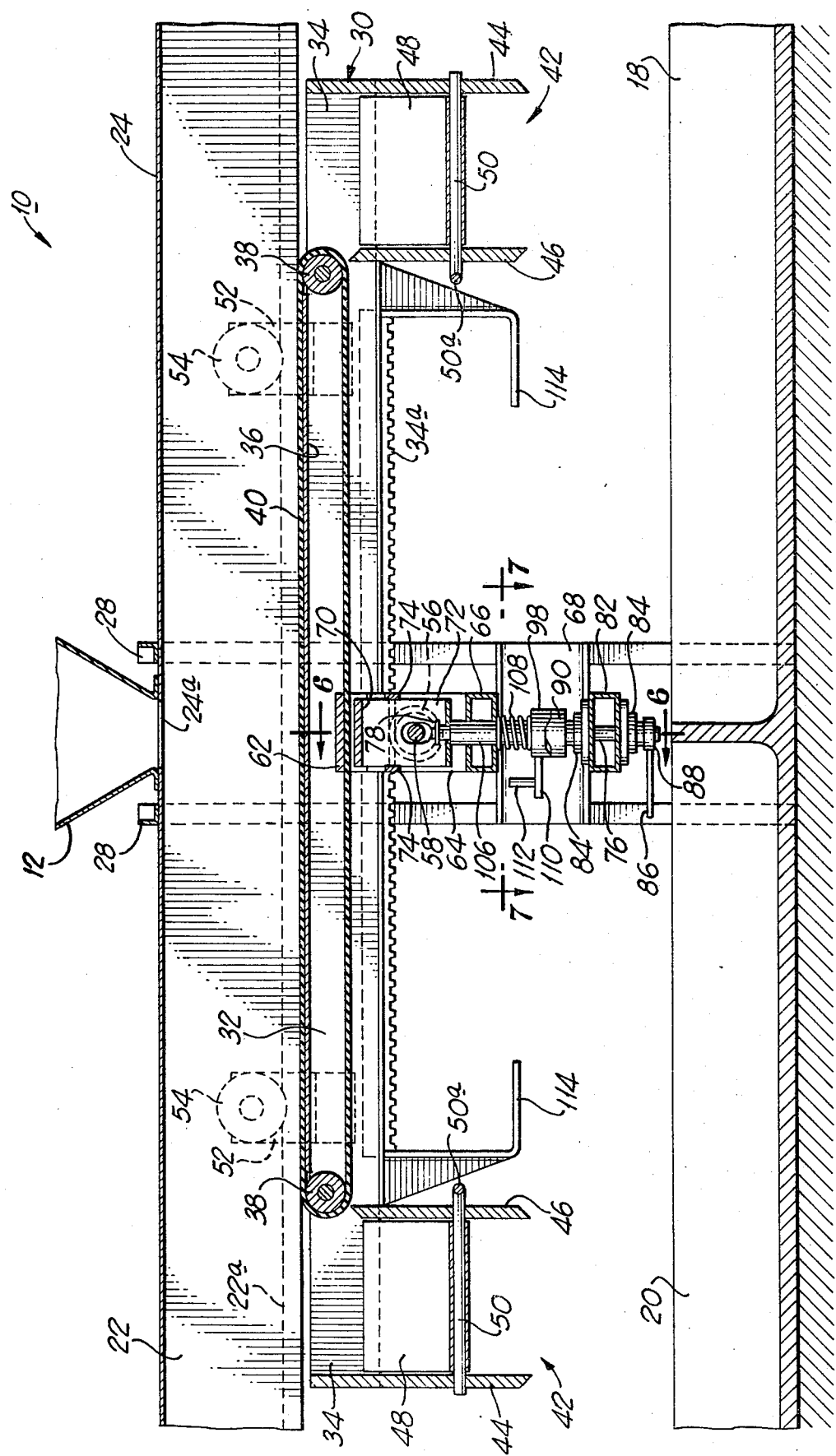

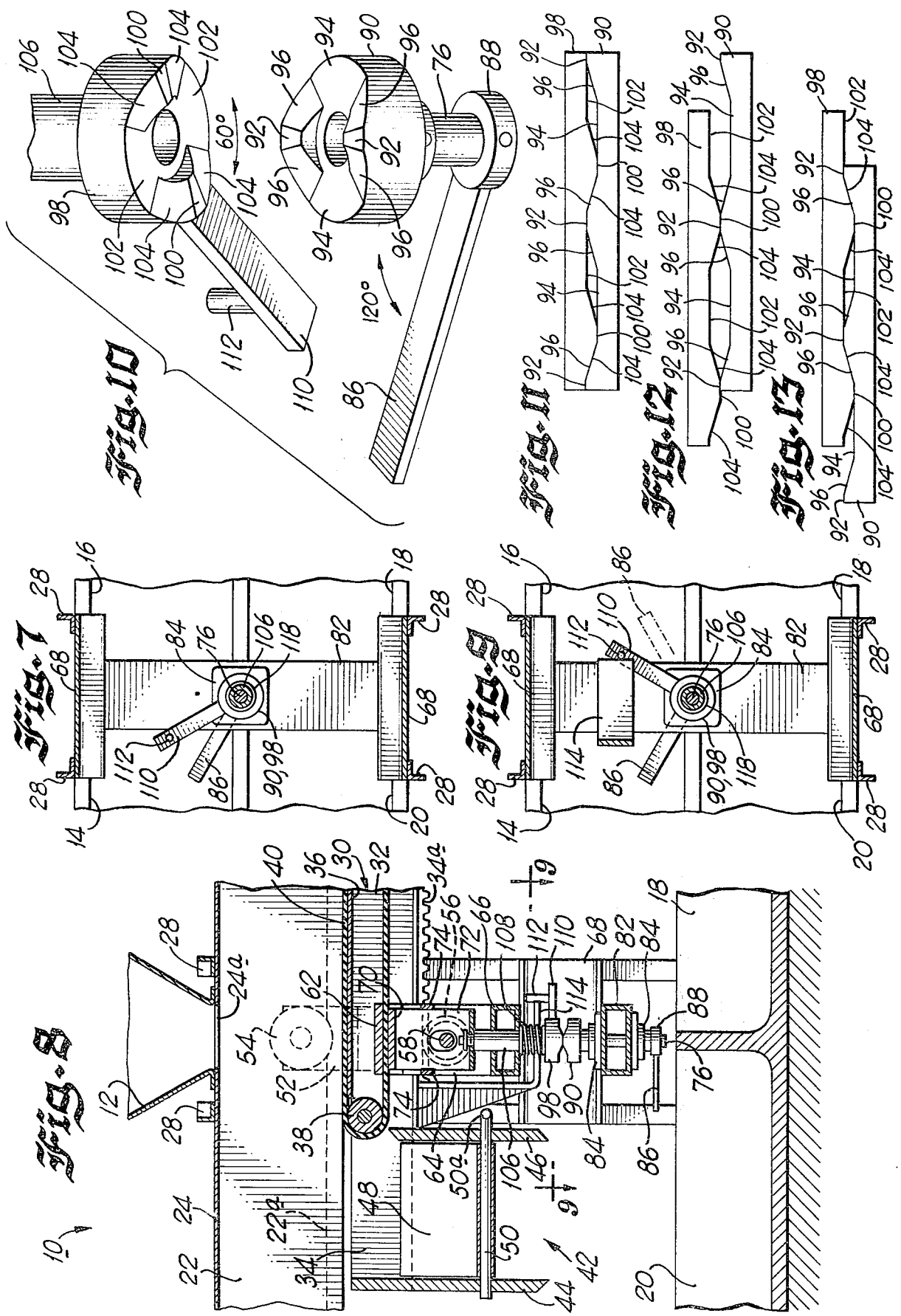

RECIPROCATING BELT FEEDER FOR ELONGATED BINS

BACKGROUND OF THE INVENTION

1. Field of the Invention

The present invention relates to feeders for distributing bulk materials and the like supplied from a common point into a selected one of a plurality of elongated feed or storage bins such as commonly used in live stock feeding operations and the like.

2. Description of the Prior Art

Clusters or arrays of elongated feed bins in feed lots are commonly utilized for live stock feeding operations. It has been difficult to uniformly distribute the feed material over the entire length of these elongated bins so that a maximum number of animals can be fed at one time without excessive crowding. Adjustable overhead delivery chutes have been utilized to supply the bins, however, these chutes tend to feed the material into separate piles at each location of discharge rather than provide a uniform distribution along the entire length of an elongated feed bin. Traveling belt conveyors have also been utilized, but again with difficulty in providing a uniform distribution of the material along the entire length of the elongated feed bins.

SUMMARY OF THE INVENTION

It is an object of the present invention to provide a new and improved feeder for distributing material from a common supply point into a selected one of a plurality of enongated feed bins which are arranged in parallel rows in end to end relation. It is an object to provide a feeder which is capable of uniformly distributing the material throughout the entire length of each elongated bin in the array of bins so that a maximum number of animals can be fed without overcrowding.

The present invention comprises an elongated conveyor having a frame and a reversible endless belt supported from the frame with drive means engaging the frame for moving the conveyor longitudinally between longitudinal opposite ends of the feed bins. Clamping means is provided for releasably holding a run of the conveyor belt and means is included for selectively discharging material from either end of the belt into the bins in a selected row. Control means is utilized for operating the clamping means to hold the belt when the frame of the conveyor is driven in one direction over the bins and when the conveyor reaches the end of the bin, the belt is unclamped and the conveyor frame is driven in the opposite direction. The control means is reversible so that material may be distributed into the bins at the opposite end of the rows as the conveyor frame is driven in the opposite direction while a run of the belt is clamped and when the conveyor frame is returned the belt is unclamped.

BEIEF DESCRIPTION OF THE DRAWINGS

FIG. 1 is a side elevational view of a new and improved feeder in accordance with the features of the present invention;

FIG. 2 is a top plan view of the feeder installation of FIG. 1;

FIG. 3 is a transverse sectional view taken substantially along lines 3—3 of FIG. 1;

FIG. 4 is a transverse sectional view taken substantially along lines 4—4 of FIG. 1;

FIG. 5 is a fragmentary longitudinal sectional view taken along lines 5—5 of FIG. 3;

FIG. 6 is a fragmentary transverse sectional view taken substantially along lines 6—6 of FIG. 5;

FIG. 7 is a horizontal sectional view taken substantially along lines 7—7 of FIG. 5;

FIG. 8 is a fragmentary longitudinal sectional view similar to FIG. 5, but showing the conveyor of the feeder in a different operative position;

FIGl 9 is a horizontal sectional view taken substantially along lines 9—9 of FIG. 8;

FIG. 10 is an exploded perspective view of a clutch assembly of the feeder constructed in accordance with the features of the present invention; and FIGS. 11, 12 and 13 are schematic diagrams showing graphically the several interrelationships of the engaging clutch members of the clutch assembly of FIG. 10.

DESCRIPTION OF THE PREFERRED EMBODIMENT

Referring now more particularly to the drawings therein is illustrated a new and improved feeder indicated generally by the reference numeral 10 and especially adapted to distribute bulk materials such as cattle feed and the like from a common supply point such as a hopper 12 into a selected one of a plurality of elongated feed bins 14, 16, 18 and 20 arranged in an array, for example, with the bins 14 and 16 in a rear row in end to end relation and the bins 18 and 20 in a front row in end to end relation. The arrangement of the elongated bins 14, 16, 18 and 20 in the array as shown in FIG. 2, provides for easy access to the feed bins by live stock over the entire length of each bin on one side so that over crowding of animals and the resultant underfeeding of the weaker individual animals is minimized.

In accordance with the present invention, the feeder 10 is especially adapted to supply a selected one of the respective elongated feed bins with bulk material such as feed grain and the like from a centrally positioned hopper 12. The material is distributed to each bin at a uniform depth throughout the entire length and the bins may be selected in any sequence desired by the operator.

The feeder includes a pair of elongated side frames 22 having upwardly extending flanges or tracks 22a along the lower edge of the side frames and as shown in FIGS. 3 and 4, side frames may be integrally formed with a top wall or hood 24 having a rectangular opening 24a at the center in communication with the lower outlet end of the supply hopper 12, as best shown in FIGS. 2, 5 and 8. The side frames 22 and integral top wall 24 extend longitudinally of the bins for substantially the entire length of the array and are supported at opposite ends by upright support frames 26. In the center, the frames 22 and top 24 are supported by a pair of upright support frames 28. The feeder includes an elongated reversible belt conveyor indicated generally by the reference numeral 30 and adapted to move longitudinally on the tracks or rails 22a for distributing material to each of the respective elongated feed bins. As shown in FIG. 1, the endless belt conveyor is in a centered position on the support rails 22a with respect to the centrally positioned supply hopper 12 and is movable from this position in opposite directions along the supporting rails between a far left position (shown in phantom) and a far right position (shown in dashed lines) for distributing the material at a substantially uniform depth along the length of each elongated bin.

The endless belt conveyor includes an elongated base or frame 32 of generally inverted, channel-shaped, transverse cross-section (FIGS. 3 and 4) having a pair of downwardly extending opposite side flanges 34 and an integral top web 36. As best shown in FIG. 5, the top web 36 terminates short of the opposite outer ends of the side flanges 34 and a pair of idler belt rolls 38 are mounted adjacent opposite ends of the top web. An endless flexible belt 40 are entrained around the idler rolls and the upper run of the belt is supported on the top web 36 of the conveyor frame. At each end, the belt conveyer is provided with a discharge hopper 42 for directing material downwardly from the belt into a selected feed bin. Each hopper includes an outer end wall 44 and an inner end wall 46 adjacent the end of the belt run and in order to direct the discharge of material from the hoppers 42 into the bins 14 and 16 in the rear row or the bins 18 and 20 in the front row, each hopper includes a deflector vane 48 mounted on a pivot axle 50 extending between the parallel walls 44 and 46. As best shown in FIG. 4, the inside end of the axle 50 of the hoppers is bent at right angles to provide a convenient operator handle 50a which is movable between alternate positions as shown in FIGS. 3 and 4 to deflect the material from the hoppers into the front or rear row of bins as selected.

The belt conveyor 30 is supported for reciprocal movement longitudinally of the array of feed bins on the tracks 22a by means of a plurality of hanger assemblies each having a bracket or arm 52 attached at its lower end to conveyor side flange 34 and a roller 54 is provided adjacent the upper end of each blanket to ride along the upper edge of the supporting track 22a. The endlss belt conveyor 30 is driven to reciprocate longitudinally along the supporting tracks 22a and for this purpose the conveyor frame side flanges 34 are formed with elongated toothed racks 34aalong their lower edges for engagement with a pair of drive gears 56 mounted on a common shaft 58 extending transversely across the array of feed bins at the center as best shown in FIGS. 2 and 3. The shaft 58 is reversibly rotated by a drive unit 60 containing an electric gear motor or the like and is supported from the mid frame supports 28. The power unit is operable to rotate the shaft in either direction and is controlled by a pair of limit switches which reverse the direction of shaft rotation when either of the discharge hoppers 42 at the end of the conveyor reaches a position adjacent the outer end of a feed bin as shown in phantom and in dotted lines in FIG. 1.

In accordance with the present invention, the feeder 10 provides for a substantially uniform depth distribution of material from the single supply hopper 12 into the elongated bins 14, 16, 18 and 20 and this distribution is accomplished for the left hand bins upon movement of the belt conveyor from a right hand position (dotted lines in FIG. 1) on a leftward stroke to the left hand position (phantom lines in FIG. 1) while the endless belt 40 is held or clamped adjacent the center of the array of bins. The material flowing onto the belt from the hopper 12 is carried into the left hand discharge hopper 42 for distribution into the bin 14 or the bin 20 depending upon the position of the deflector vane 48. With the belt clamped relative to the feed bins, as the material flows onto the belt with the left hand end of the belt moving toward the left (as viewed in FIG. 1) the material spills over the left end of the belt downwardly into the left hand hopper 42 in a uniform distribution over substantially the entire length of the selected left hand bin 14 or 20. When the left hand discharge hopper 42 reaches the left end of the bins, a limit switch is contacted to reverse the direction of the drive unit 60 and the belt is unclamped. When the drive gears 56 are rotated in a clockwise direction, the conveyor frame 32 moves from the far left hand position on a rightward stroke toward the opposite or right hand position. During the conveyor movement from left to right with the belt unclamped, the material flowing from the hopper 12 is accumulated at a uniform depth over the entire length of the upper run of the belt and when the conveyor reverses direction after reaching the far right position a fully supply of material will be on the belt ready for distribution. As the conveyor begins another cycle of travel from right to left the material already on the upper run is discharged from the left end of the belt into the selected bin 14 or 20 in a substantial depth over the entire length of the bin. As the material is discharged from the left end of the belt fresh material is being supplied intermediate the ends of th belt from the hopper 12.

When it is desired to deliver material into the right hand bins 16 or 18, the conveyor frame 32 is driven from left to right by clockwise rotation of the drive gears 56 (FIG. 1) while the belt is clamped and upon reaching the far right position, a limit switch is contacted for reversing the direction of drive and the belt is unclamped during the conveyor return stroke from right to left while the material is accumulating on the surface of the belt from the supply hopper. The feeder 10 is thus selectively operable to feed material delivered at a substantially uniform depth along the entire length of any selected one of the bins 14, 16, 18 or 20. The selection between bin rows dependent upon the position of the deflector vanes 48 in the respective discharge hoppers 42 the selection between the left and right hand bins depends upon the direction of conveyor movement while the belt 40 is held in clamped relation to the bins.

For the purpose of selectively clamping and releasing the belt 40, the feeder includes a fixed upper clamping bar 62 extending transversely across and above the lower run of the belt as best shown in FIGS. 3 and 5. The upper clamping bar is supported at opposite ends by a pair of substantially Z-shaped, upright legs 64 having their lower ends secured to a cross-member 66 supported at opposite ends by channels 68 attached to the inside edges of the upright supports 28. Releasable clamping of the lower run of the belt 40 against the under surface of the fixed clamping bar 62 is accomplished by the means of a smaller, vertically movable, lower clamping bar 70. The lower clamping bar is movable toward and away from the fixed upper clamping bar between a belt clamping and a release position as shown respectively in FIGS. 8 and 3. As best shown in FIGS. 3 and 6, the lower movable clamping bar is centrally supported on a U-shaped bracket 72 disposed for vertical sliding movement between the lower vertical segments of the Z-shaped legs 64 supporting retaining bars 74 between the lower portions of the Z-shaped legs hold the U-shaped brackets 72 in place for vertical sliding movement. The vertical legs of the U-shaped bracket 72 and the lower segments of the Z-shaped legs 64 are provided with suitable slots and apertures therein to accommodate the centrally positioned drive shaft 58 as shown in FIG. 6.

The lower or bight portion of the U-bracket 72 is provided with a circular aperture to accommodate the upper end portion of a vertical, rotatable control shaft 76 having a stop washer 78 and cap screw 80 on the upper end to limit the upward travel of the U-shaped bracket 72 and the lower clamping bar 70.

The control shaft 76 is supported from a cross-member 82 attached at opposite ends to the lower flanges of the channels 68 and suitable support bearings 84 are provided on the upper and lower surfaces of the cross-member to hold the control shaft in vertical position for selected rotation. Rotation of the control shaft 76 is achieved by a lower control handle 86 extending outwardly from a lower shaft collar 88 which is keyed or pinned onto the lower portion of the shaft as best shown in FIG. 7 or 6. A lower clutch collar 90 (best shown in FIG. 10) is mounted on the shaft 76 and is keyed or pinned thereto so that when the control handle is moved between selected left or right bin feed positions the shaft is rotated approximately 120°. The lower clutch collar includes a pair of diametrically opposite outwardly extending lands 92 and a pair of lower flat grooves 94. Intermediate, sloping transition surfaces 96 interconnect the lands and grooves as shown diagramatically in FIGS. 11, 12 and 13.

An upper clutch collar 98 having similar but downwardly depending lands 100 spaced diametrically apart and grooves or flats 102 intermediate thereof interconnected by sloping transition surfaces 104 is mounted on the lower end of a hollow tubular shaft 106 having an axial bore for receiving the vertical control shaft 76 as best shown in FIG. 6. The hollow shaft is biased downwardly and urges the surfaces 100, 102 and 104 of the upper clutch collar 98 toward engagement with mating surfaces 92, 94 and 96 of the lower clutch collar 90. A compression spring 108 is mounted on the hollow shaft between the lower surface of the cross-member 66 and the upper annular surface of the upper clutch collar 98 to bias the collar downwardly. The upper end of the hollow shaft bears against the underside of the bight portion of the U-shaped bracket 72 to support the same and urge the lower clamping bar 70 upwardly into clamping engagement when the shaft is raised. Rotation of the upper clutch collar and the shaft is accomplished by means of an actuating arm 110 extending radially and outwardly thereof and having upwardly extending actuating pin 112 adjacent the outer end.

Referring to FIGS. 9 and 10, when the control handle 86 for the lower clutch collar 90 is positioned to the left, the conveyor 30 is adapted to travel from right to left with the belt 40 clamped and to return from left to right with the belt unclamped. The lands 92 on the lower clutch collar 90 are engaged with the lands 100 on the upper clutch collar 98 (as shown schematically in the intermediate diagram of FIG. 12) so that the lower clamping bar 70 is biased upwardly against the spring 108 to engage and clamp the belt 40 tightly as the conveyor moves from right to left. In order to unclamp the belt when the conveyor 30 reaches the far left hand position (shown in phantom in FIG. 1) there are provided a pair of depending actuating brackets 114 mounted adjacent the opposite ends of the belt runs. These brackets are positioned to engage the upstanding actuating arm pin 112 on the arm 110 to rotate the upper clutch collar 98 through approximately 60° between the position shown in FIG. 9 and the position shown in FIG. 7. When the conveyor 30 reaches the end of a leftward stroke, the right hand actuating bracket 114 engages the pin 112 and causes the arm 110 to rotate from the position of FIG. 9 to position of FIG. 7. This rotation moves the land surfaces 92 and 100 of the lower and upper clutch collars, respectively, out of confronting engagement to an alternate position (shown schematically in the lower view of FIG. 13) wherein the right hand sloping surfaces 96 are engaged with the right hand sloping surfaces 104. This relative rotation between the clutch collars permits the shaft 106 to move downwardly under the influence of the biasing spring 108 and thus unclamp the belt for the return stroke of the conveyor from left to right. Actuation of a limit switch reverses the direction of conveyor movement each time the conveyor reaches a far left or far right position. In the far right position, the left hand actuating bracket 114 on the conveyor frame 32 engages the pin 112 on the upper clutch arm 110 and causes rotation from the position of FIG. 7 to the position of FIG. 9. At this occurs, the land surfaces 92 and 100 of the lower and upper clutch collars 90 and 98, respectively, are brought back into confronting engagement which causes the shaft 106 to lift the U-bracket 72 and lower clamping bar 70 to clamp the belt during the next righward stroke of the conveyor. In this selected mode of operation, the left hand bins may be filled at a uniform depth over their entire length and depending upon where the left hand manual control handle 50a is set the bin 20 in the front row or the bin 14 in the rear row may be selected for filling. When it is desired to feed the right hand bins 16 or 18, the control handle 86 is pivoted approximately 120° from the position of FIG. 9 (shown in solid lines) to the right hand feed positon as shown in phantom. The belt 40 is then clamped or held during a rightward stroke of the conveyor 30 and is unclamped during a leftward or return stroke. (The clutch positioned schematically as in FIG. 11).

From the foregoing it will be seen that any one of the bins 14, 16, 18 and 20 may be filled from the common supply hopper 12. The material is distributed at a substantially uniform depth along substantially the entire length of each elongated feed bin. The control handles 50a are used to select the bin in the front or the rear rows. The position of the control handle 86 on the shaft 76 determines whether the left hand or right hand bins are filled. Once a selection is made, a bin will be filled on a continuous basis until the selection is changed, the power unit 60 is deenergized or the material supply from the hopper 12 is exhausted.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A feeder for distributing material from a common supply point into a selected one of a plurality of elongated bins, said bins arranged in parallel rows in side by side relation and in end to end relation in said rows, said feeder comprising:
   an elongated conveyor having a frame and a reversibly movable belt supported from said frame,
   drive means positioned adjacent said common supply point engaging said frame for reciprocally moving said conveyor longitudinally on opposite sides of said common supply point between longitudinal opposite ends of said bins, clamping means for sequentially holding and releasing a run of said conveyor belt with respect to the direction of movement of said conveyor, means for discharging material from said belt into a selected bin in a selected row threof, and cam means for controlling said clamping means and selectively movable between a first position operative to clamp said belt when said frame is driven in one direction along said bins and to release said belt when said frame is driven in an opposite direction, and a second position operative to clamp said belt when said frame is driven in said opposite direction along said bins and to release said belt when said frame is driven in said one direction, said cam means comprising a pair of cam members having confronting cam surfaces and a selector for moving a cam surface of one of said cam members relative to the other between said first and second positions and actuator means on said conveyor for moving a cam surface of the other of said cam members relative to said one cam member in response to the position of said conveyor relative to said bins.

2. The feeder of claim 1 wherein said means for discharging material comprises a discharge chute at opposite ends of said belt supported from said frame and deflector means in each chute movable between selected opposite positions for diverting a flow of material in a selected one of opposite lateral directions relative to said belt.

3. The feeder of claim 1 wherein said conveyor frame is provided with elongated rack means and said drive means includes pinion means engaging said rack means to reciprocally move said conveyor along said bins.

4. The feeder of claim 1 including an elongated track above said bins and extending longitudinally along said rows and roller support means for supporting said conveyor on said track for longitudinal reciprocal movement thereon.

5. The feeder of claim 1 wherein said clamping means included a fixed clamping member engagable with one side of said belt on a lower run thereof and a movable clamping member movable toward and away from an opposite side of said belt on said lower run between a clamping position biasing said belt against said fixed clamping member and a released position wherein said belt is movable between said clamping members.

6. The feeder of claim 5 including means for biasing said movable clamping member toward said released position and wherein said cam means is operative to bias said movable claping member toward said clamping position.

7. The feeder of claim 1 wherein said actuator means comprises an actuator arm connected to move said other cam member and a pair of actuator members on opposite ends of said conveyor engaging said arm when opposite ends of said conveyor reaches positions adjacent opposite ends of said bins in a row.

8. The feeder of claim 7 wherein said selector means includes a control handle movable between alternate positions for reversing the sequence of clamping and releasing said belt in relation to the direction of travel of said conveyor frame.

* * * * *